(12) United States Patent
Thompson

(10) Patent No.: US 10,695,238 B2
(45) Date of Patent: Jun. 30, 2020

(54) MOUNTABLE ELEVATOR

(71) Applicant: Charlie Homer Thompson, Santa Teresa, NM (US)

(72) Inventor: Charlie Homer Thompson, Santa Teresa, NM (US)

(\*) Notice: Subject to any disclaimer, the term of this patent is extended or adjusted under 35 U.S.C. 154(b) by 0 days.

(21) Appl. No.: 16/573,608

(22) Filed: Sep. 17, 2019

(65) Prior Publication Data

US 2020/0085648 A1 Mar. 19, 2020

Related U.S. Application Data

(60) Provisional application No. 62/732,190, filed on Sep. 17, 2018.

(51) Int. Cl.
*A61G 3/06* (2006.01)
*B60P 1/44* (2006.01)

(52) U.S. Cl.
CPC ............. *A61G 3/062* (2013.01); *A61G 3/068* (2016.11); *B60P 1/4421* (2013.01); *B60P 1/4492* (2013.01); *A61G 2220/16* (2013.01)

(58) Field of Classification Search
CPC .... A61G 3/062; A61G 3/068; A61G 2220/16; B61D 23/02; B61D 23/025; B60P 1/4414; B60P 1/4421; B60P 1/4485; B60P 1/4492; Y10S 414/134
USPC .................................. 105/431, 447; 414/921
See application file for complete search history.

(56) References Cited

U.S. PATENT DOCUMENTS

| | | | |
|---|---|---|---|
| 808,076 A * | 12/1905 | Felkner et al. | B60J 9/02 105/438 |
| 977,504 A * | 12/1910 | Bishop | B61D 23/02 105/427 |
| 3,912,048 A | 10/1975 | Manning | |
| 3,913,497 A | 10/1975 | Maroshick | |
| 3,984,014 A | 10/1976 | Pohl | |
| 4,010,859 A | 3/1977 | Ronian et al. | |
| 4,058,228 A | 11/1977 | Hall | |
| 4,081,091 A | 3/1978 | Thorley | |
| 4,124,097 A * | 11/1978 | Hawks | B60P 1/4421 187/200 |
| 4,124,130 A | 11/1978 | Rohrs et al. | |

(Continued)

FOREIGN PATENT DOCUMENTS

| | | |
|---|---|---|
| EP | 0003950 A2 | 9/1979 |
| GB | 2451150 A | 1/2009 |
| WO | 2007113501 A1 | 10/2007 |

*Primary Examiner* — James Keenan
(74) *Attorney, Agent, or Firm* — Holzer Patel Drennan

(57) ABSTRACT

A mountable elevator system includes one or more horizontal bearing frames and one or more vertical frames, each vertical frame being connected to one of the horizontal bearing frames. One or more step stringers extend between the one or more horizontal bearing frames and the one or more vertical frames. A multi-piece platform includes multiple step pieces mounted on the one or more step stringers. The cabling is configured to extend and retract the multi-piece platform. One or more step support locking structures can be configured to secure a top step piece of the multi-piece platform, wherein the multiple step pieces of the multi-piece platform separate into multiple vertical levels as the multi-piece platform extends. The multi-piece platform is configured to raise and lower relative to an entry door of a vehicle.

18 Claims, 17 Drawing Sheets

(56) References Cited

U.S. PATENT DOCUMENTS

| | | | |
|---|---|---|---|
| 4,134,504 A | 1/1979 | Salas et al. | |
| 4,140,230 A | 2/1979 | Pearson | |
| 4,168,134 A | 9/1979 | Pohl | |
| 4,180,366 A | 12/1979 | Roth et al. | |
| 4,251,179 A | 2/1981 | Thorley | |
| 4,285,416 A * | 8/1981 | Dudynskyj | B60R 3/02 |
| | | | 187/200 |
| 4,325,668 A | 4/1982 | Julian et al. | |
| RE31,157 E * | 2/1983 | Perkins | B60P 1/4421 |
| | | | 414/545 |
| 4,556,128 A | 12/1985 | Thorley et al. | |
| 4,583,466 A * | 4/1986 | Reddy | B61D 23/02 |
| | | | 105/443 |
| 4,606,433 A | 8/1986 | Smalley et al. | |
| 4,907,936 A | 3/1990 | Bourdage | |
| 4,958,979 A | 9/1990 | Svensson | |
| 4,984,955 A * | 1/1991 | McCullough | B66B 9/00 |
| | | | 187/243 |
| 5,040,936 A | 8/1991 | Rhea | |
| 5,105,915 A | 4/1992 | Gary | |
| 5,158,419 A | 10/1992 | Kempf et al. | |
| 5,180,275 A | 1/1993 | Czech et al. | |
| 5,316,432 A * | 5/1994 | Smalley | B60R 3/02 |
| | | | 187/200 |
| 5,375,962 A | 12/1994 | Kempf | |
| 5,425,615 A | 6/1995 | Hall et al. | |
| 5,439,342 A | 8/1995 | Hall et al. | |
| 5,499,694 A | 3/1996 | Dorn | |
| 5,542,811 A | 8/1996 | Vartanian | |
| 5,632,357 A | 5/1997 | Matre | |
| 5,865,593 A | 2/1999 | Cohn | |
| 5,901,813 A * | 5/1999 | Orgal | B66B 9/08 |
| | | | 187/200 |
| 5,937,971 A * | 8/1999 | Storm | B66B 9/0869 |
| | | | 187/200 |
| 5,975,830 A | 11/1999 | Goodrich et al. | |
| 6,039,528 A | 3/2000 | Cohn | |
| 6,042,327 A | 3/2000 | DeLeo et al. | |
| 6,086,314 A | 7/2000 | Savaria | |
| 6,203,266 B1 | 3/2001 | Savaria et al. | |
| 6,305,897 B1 | 10/2001 | Budd et al. | |
| 6,357,992 B1 | 3/2002 | Ringdahl et al. | |
| 6,379,102 B1 | 4/2002 | Kameda | |
| 6,398,479 B1 | 6/2002 | Dupuy et al. | |
| 6,726,435 B1 | 4/2004 | Williams et al. | |
| 6,837,670 B2 | 1/2005 | Goodrich | |
| 7,290,975 B2 | 11/2007 | Richard et al. | |
| 7,445,416 B2 | 11/2008 | O'Leary et al. | |
| 7,467,917 B2 | 12/2008 | Fisher et al. | |
| 8,113,760 B1 | 2/2012 | Schroll | |
| 8,246,063 B1 * | 8/2012 | Rowland | B60R 3/02 |
| | | | 280/166 |
| 8,998,558 B2 | 4/2015 | Kitchin et al. | |
| 10,227,211 B2 * | 3/2019 | Lyons | B66B 9/0869 |
| 2007/0212206 A1 * | 9/2007 | Milne | A61G 3/063 |
| | | | 414/545 |

\* cited by examiner

MOUNTABLE ELEVATOR

CROSS-REFERENCE TO RELATED APPLICATIONS

The present application claims benefit of priority to U.S. Provisional Patent Application No. 62/732,190, entitled "Mountable Elevator" and filed on Sep. 17, 2018, which is specifically incorporated by reference for all that it discloses and teaches.

BACKGROUND

Ambulatory-handicapped individuals, including non-ambulatory individuals, face challenges when entering and exiting different types of vehicles, particularly recreational vehicles with their entry doors positioned high above the ground. Moreover, typical vehicles are not well-equipped with mechanisms for assisting such individuals with their entry and exit from the vehicles. For example, existing elevator technologies for RV's, trucks, vans, buses, or trailers are not satisfactory because their installation requires significant alteration to the vehicle's structure.

SUMMARY

The challenges described above may be addressed by a mountable elevator system includes one or more horizontal bearing frames, one or more vertical frames, each vertical frame being connected to one of the horizontal bearing frames, one or more step stringers extending between the one or more horizontal bearing frames and the one or more vertical frames, a multi-piece platform including multiple step pieces mounted on the one or more step stringers, and cabling extending along the one or more horizontal bearing frames and the one or more vertical frames, the cabling being configured to extend and retract the multi-piece platform.

In various implementations, the elevator system includes one or more vertical frames, each vertical frame movably mountable to an exterior of a vehicle at an entry door to the vehicle, one or more horizontal bearing frames connected to the one or more vertical frames, and a multi-piece platform rotatably attached to the one or more horizontal bearing frames, the multi-piece platform including multiple step pieces, wherein the multi-piece platform is configured to raise and lower relative to the entry door of the vehicle and the multiple step pieces of the multi-piece platform is configured to deploy as a flat elevator platform as the multi-piece platform is lowered in an elevator mode and as multiple descending steps as the multi-piece platform is lowered in a step mode.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

A mountable elevator is designed to safely move the ambulatory-handicapped safely from the ground into and out of a recreational vehicle with minimal "hands-on" effort. Recreational vehicles by the nature of their manufacture limit the capabilities of the mountable elevator. The mountable elevator's dimensions and capacity can be adapted to accommodate wheelchairs, increase the number of steps, etc. depending on where the elevator will be mounted.

An example mountable elevator requires little or no alteration to the vehicle's structure. It utilizes space provided by the manufacturer and is installed on the exterior of the vehicle projecting a short distance from the vehicle's side (e.g., no more than 4" from the vehicle's side in one implementation). It should also be understood that such a mountable elevator could be mounted on other structures, such as outdoor decks, patios, office buildings and homes, school buildings, as a cost-effective means for improving accessibility for ambulatory handicapped people.

The mountable elevator folds and locks against the side of the vehicle while traveling. When parked, the mountable elevator operates as an up and down elevator or extend as steps leading down from the vehicle. In one implementation, the mounted elevator system can deploy in both platform mode and step mode using gravity as a motive force, while using a winch and cabling to control the deployment under the influence of gravity, although other motive forces may also be used including gears, springs, motors, hydraulics, screws, etc. Biasing mechanisms may be used to guide the platform away from the vehicle's side when deployment is initiated, after which gravity can continue to assist in the deployment. One or more locking structures can be used to secure the top step of the multiple-segment platform, causing the step pieces to deploy as steps, rather than a flat platform. The steps are beneficial safety features, especially at night. The steps can also be deployed at night in case of an emergency.

The mountable elevator is suitable for installation on RVs having a floor that extends fully to the entry door. In one implementation, a minimum of 3" on each side is required between the entry door molding and the nearest obstacle on the vehicle side panel, although other implementations may work with a different dimension between the entry door molding and the nearest obstacle on the vehicle side panel.

In one implementation, the mountable elevator operates on 12 v, 50-amp DC circuit from the primary power source, although other power sources are contemplated. Control of motors, electrical and mechanical components on one implementation of the mountable elevator is by radio frequency (RF) transmitter (remote) and receiver. The mountable elevator can also be controlled by Bluetooth technology, hardwired controller, cell phone apps, infra-red technologies, and programmable micro-chips.

Figure 1:
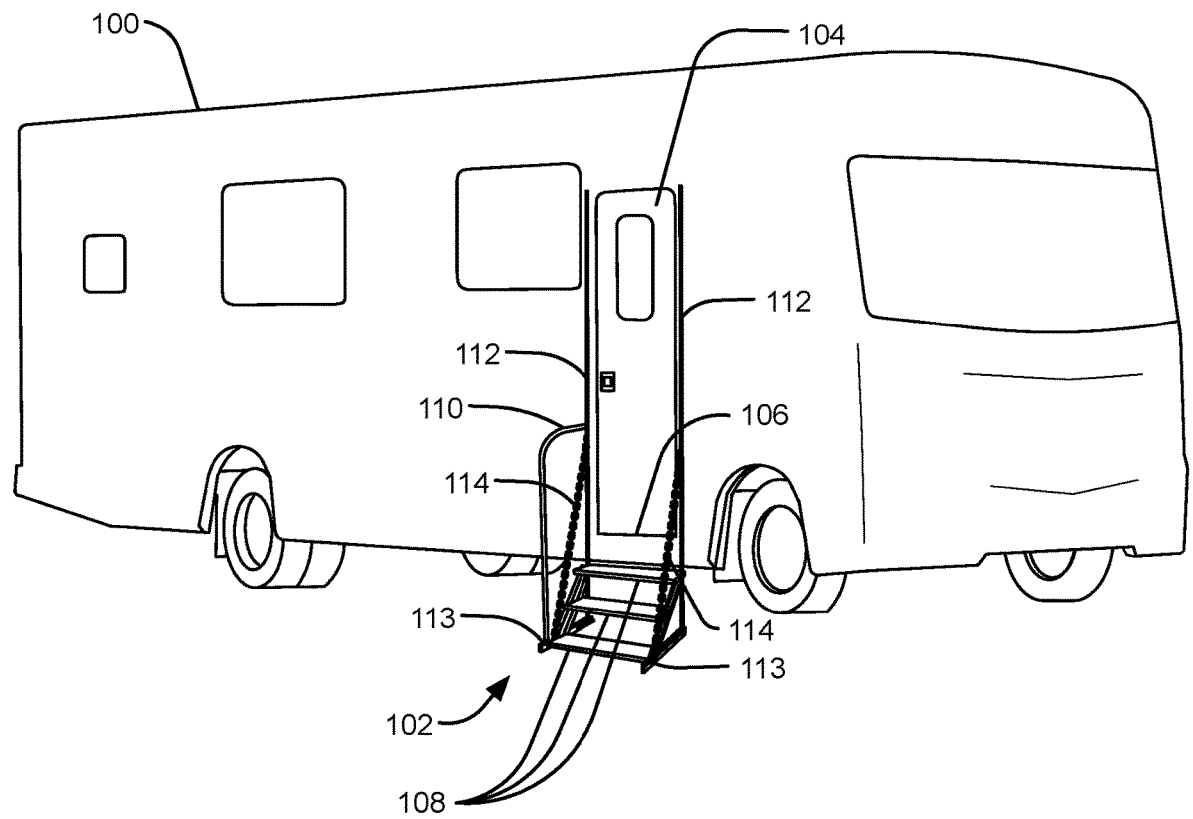
FIG. 1 illustrates a recreational vehicle with an example mountable elevator mounted to the exterior of the vehicle with the elevator extended in a step mode.

FIG. 1 illustrates a recreational vehicle 100 with an example mountable elevator 102 mounted to the exterior of the vehicle 100 with the elevator 102 extended in a step mode. The mountable elevator 102 is mounted against a side of the vehicle 100 at an entry door 104 to allow an ambulatory individual to walk up and down steps 108 over the threshold 106 of the entry door 104. In the illustrated implementation, the mountable elevator 102 is deployed to provide three steps and be lowered toward the ground. The bottom step is positioned at approximately a step-height distance above the ground to allow an ambulatory individual to comfortably step down from the bottom step to the ground, and the top step is positioned near the threshold 106 of the entry door 104 (e.g., roughly even with the threshold 106 or at about a step-height distance below the threshold 106). In one implementation, the distance from the ground is limited by an infrared proximity sensor positioned at the bottom of the bottom step, or it may be limited manually (e.g., by stopping the lowering operation).

The number of steps and the distances from the ground and the threshold 106 may be adjusted as appropriate. One or more safety rails 110 are attached to frames 112 and 113 of the mountable elevator 102 in order to raise and lower the safety rails 110 with the steps. One or more ends of a safety rail 110 may be detached from one or more of the frames 112 and 113 (e.g., when the mounted elevator is closed against the entry door 104). Chains 114 provide structural support between the upright frames 112 and the horizontal bearing frames 113.

Figure 2:
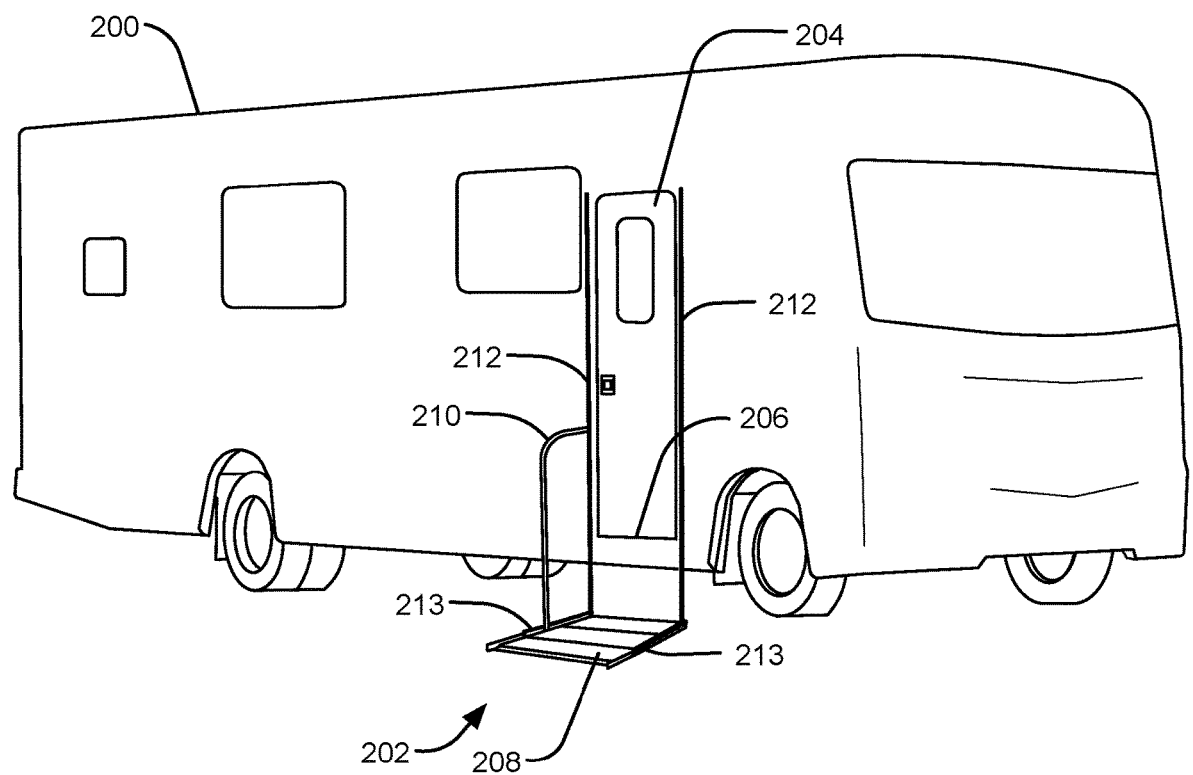
FIG. 2 illustrates a recreational vehicle with an example mountable elevator mounted to the exterior of the vehicle with the elevator extended in an elevator mode and in a lowered position.

FIG. 2 illustrates a recreational vehicle 200 with an example mountable elevator 202 mounted to the exterior of the vehicle 200 with the elevator 202 extended in an elevator mode and in a lowered position. The mountable elevator 202 is mounted against a side of the vehicle 200 at an entry door 204 to allow a non-ambulatory individual to roll a wheelchair over a threshold 206 into and out of the entry door 204, although the positioning may be adjusted to accommodate other ambulatory complications, such as crutches. In the lowered position, as illustrated, an elevator platform 208 is positioned at or close enough to the ground to allow the wheelchair to roll from the ground to the elevator platform 208 or vice versa. In one implementation, the distance from the ground is limited by an infrared proximity sensor positioned at the bottom of the platform 208.

One or more safety rails 210 are attached to frames 212 and 213 of the mountable elevator 202 in order to raise and lower with the platform 208. The one or more ends of a safety rail 210 may be detached from one or more of the frames 212 and 213 (e.g., when the mounted elevator is closed against the entry door 204). Chains (not shown) can provide structural support between the upright frames 212 and the horizontal bearing frames 213.

Figure 3:
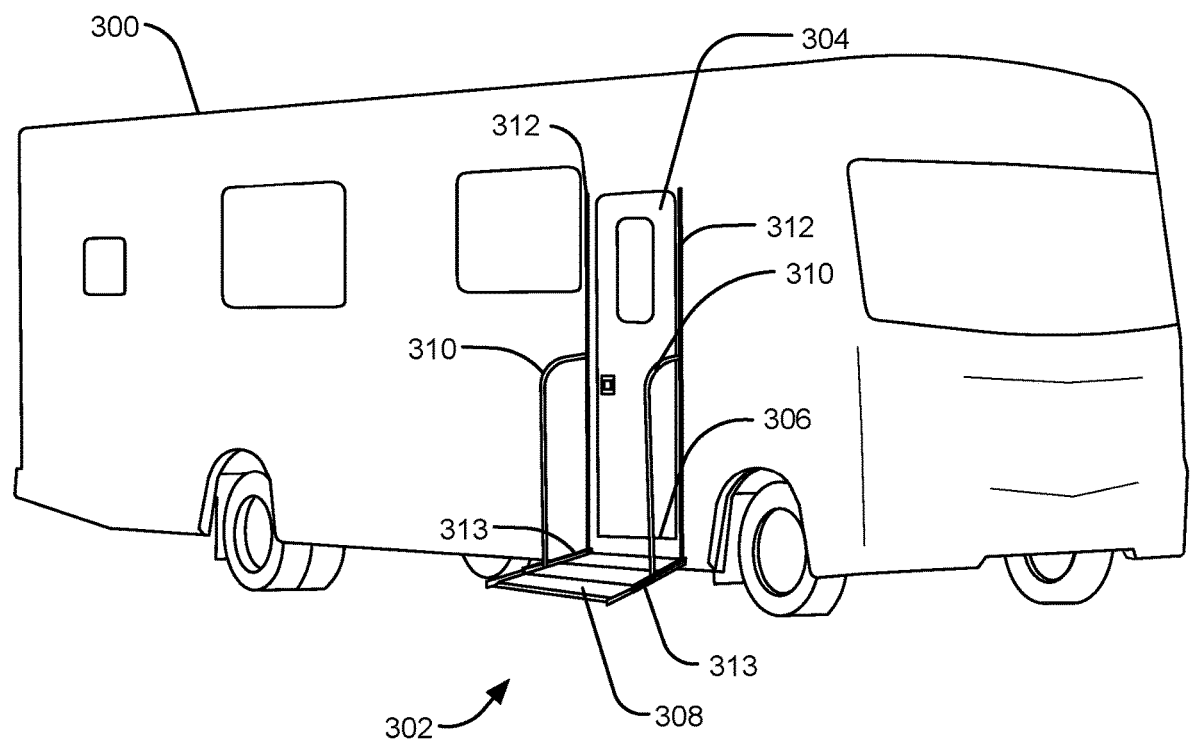
FIG. 3 illustrates a recreational vehicle with an example mountable elevator mounted to the exterior of the vehicle with the elevator extended in an elevator mode and in a raised position.

FIG. 3 illustrates a recreational vehicle 300 with an example mountable elevator 302 mounted to the exterior of the vehicle 300 with the elevator 302 extended in an elevator mode and in a raised position. The mountable elevator 302 is mounted against a side of the vehicle 300 at an entry door 304 to allow a non-ambulatory individual to roll a wheelchair over a threshold 306 into and out of the entry door 304, although the positioning may be adjusted to accommodate other ambulatory complications, such as crutches. In the raised position, as illustrated, an elevator platform 308 is positioned at or close enough to the threshold 306 of the entry door 304 to allow the wheelchair to roll from the entry door 304 to the elevator platform 308 or vice versa. In one implementation, the distance from the ground is limited by an infrared proximity sensor positioned at or near the threshold 306.

One or more safety rails 310 are attached to frames 312 and 313 of the mountable elevator 302 in order to raise and lower with the platform 308. The one or more ends of a safety rail 310 may be detached from one or more of the frames 312 and 313 (e.g., when the mounted elevator is closed against the entry door 304). Chains (not shown) can provide structural support between the upright frames 312 and the horizontal bearing frames 313.

Figure 4:
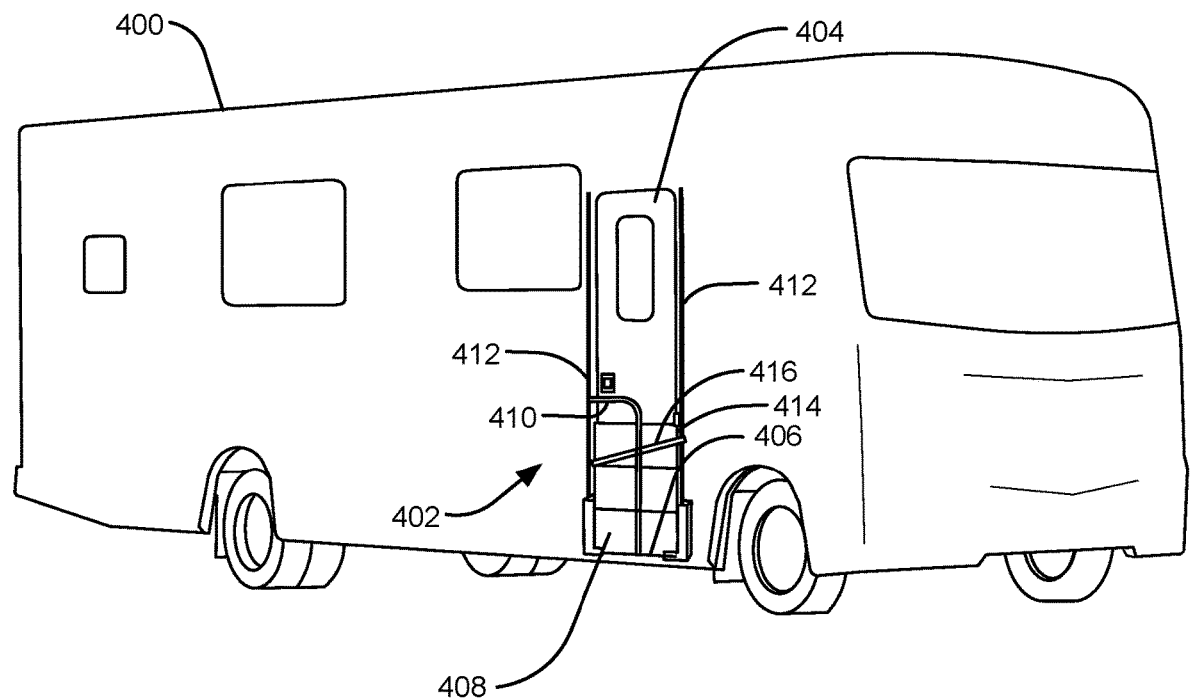
FIG. 4 illustrates a recreational vehicle with an example mountable elevator mounted to the exterior of the vehicle with the elevator in a closed mode.

FIG. 4 illustrates a recreational vehicle 400 with an example mountable elevator 402 mounted to the exterior of the vehicle 400 with the elevator 402 in a closed mode. The mountable elevator 402 is mounted against a side of the vehicle 400 at an entry door 404 to allow a non-ambulatory individual to roll a wheelchair over a threshold 406 into and out of the entry door 404, although the positioning may be adjusted to accommodate other ambulatory complications, such as crutches.

In the closed mode, as illustrated, an elevator platform 408 is raised toward the entry door 404, and a safety rail 410 is closed against the platform 408. A support arm 416 is positioned on the bottom of the platform 408. When closed, the platform 408 can be folded toward the entry door 404, at which point the one end of the support arm 416 can be raised to fit into a platform catch 414 to secure the platform 408 in a closed position. In one implementation, the distance the mountable elevator 402 is raised relative to the platform catch is limited by an infrared proximity sensor positioned at or near one of the upright frames 412 near the platform catch 414. When the platform 408 is lowered, the secured end of the support arm 416 is released from the platform catch 414 so that it is free to unfold into elevator or step mode.

Figure 5:
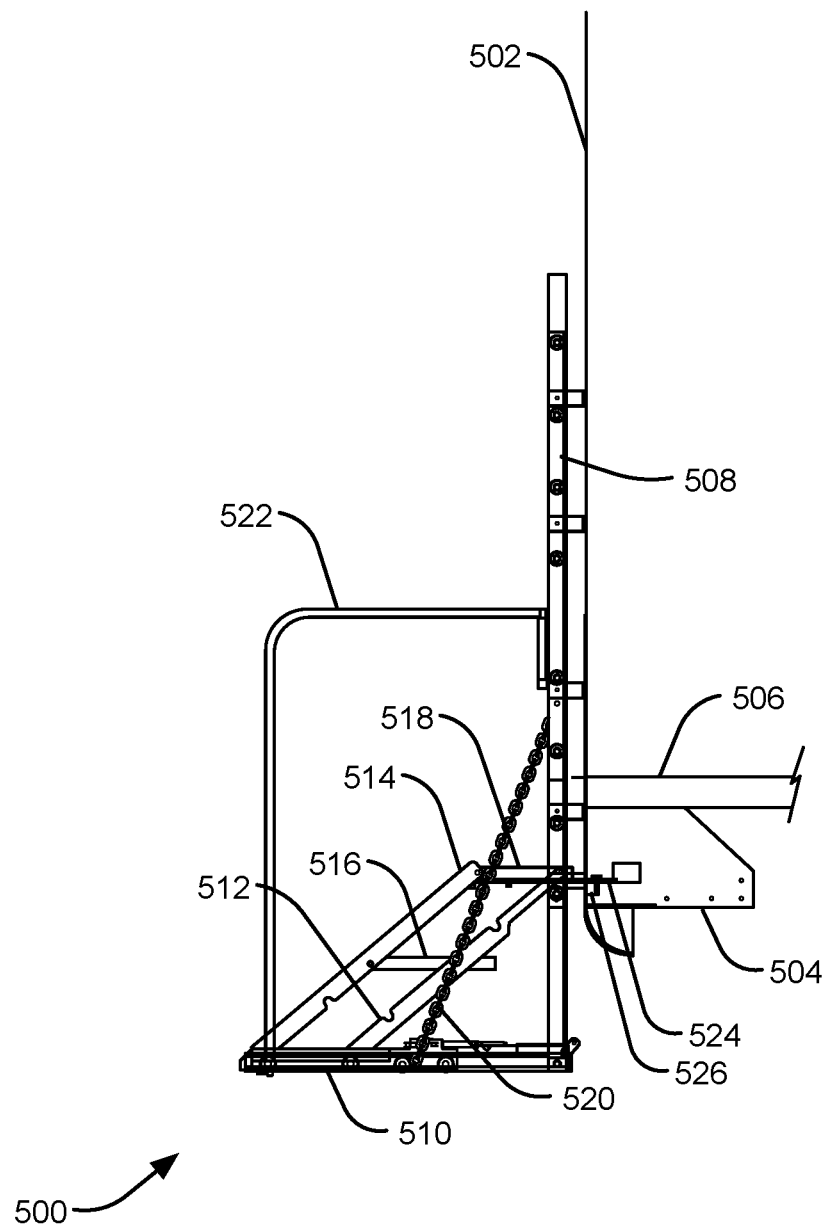
FIG. 5 illustrates a side view of an example mountable elevator mounted to an exterior of the vehicle in a step mode.

FIG. 5 illustrates a side view of an example mountable elevator 500 mounted to an exterior of the vehicle 502 in a step mode. An actuator assembly 504 includes control electronics and/or mechanisms for moving the mountable elevator 500 up and down along the frames on the exterior of the vehicle 502 to deploy/retract the platform/steps of the mountable elevator 500. In one implementation, the actuator assembly 504 includes a winch connected to a system of cables and pulleys to manipulate the mountable elevator 500, although other actuators and/or systems may be employed, such as a network of individual actuators placed as appropriate positions on the mountable elevator 500 (e.g., to raise and lower the elevator 500, to raise and lower the platform, to extend/retract the steps). In the illustrated implementation, the actuator assembly 504 is mounted beneath the floor 506 of the vehicle (e.g., beneath the door threshold), although other locations are contemplated.

A vertical frame 508 is movably attached the side of the vehicle 502, such that the vertical frame 508 can slide or roll up and down as the mountable elevator 500 raises and lowers. A horizontal frame 510 supports the step structure, which is shown in the side view as consisting of two diagonal stringers 512 and 514 attached to the horizontal frame 510. The stringers 512 and 514 are supported near the vehicle 502 by one or more step support arms 524 (against a bar 526) and descend diagonally to separate the step platform pieces 516 and 518 as steps when in step mode. When in elevator mode, the stringers 512 and 514 lay roughly in the lateral plane of the horizontal frame 510, with the step platform pieces lying flat on the horizontal frame 510 to form an elevator platform.

A chain 520 is attached between the vertical frame 508 (or vehicle side) and the horizontal frame 510 to provide additional support for weight-bearing on the horizontal frame 510 when in use. A safety rail 522 is also attached between the vertical frame 508 (or vehicle side) and the horizontal frame 510.

Figure 6:
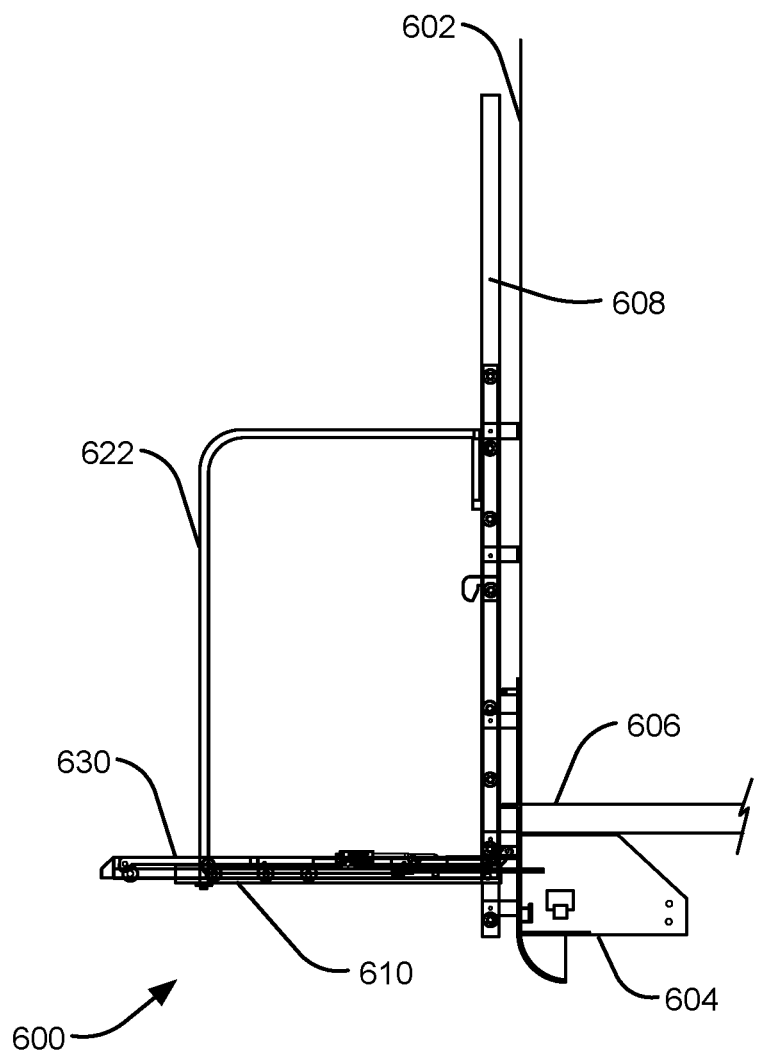
FIG. 6 illustrates a side view of an example mountable elevator mounted to an exterior of the vehicle in an elevator mode and in a raised position.

FIG. 6 illustrates a side view of an example mountable elevator 600 mounted to an exterior of the vehicle 602 in an elevator mode and in a raised position. An actuator assembly 604 includes control electronics and/or mechanisms for moving the mountable elevator 600 up and down along the frames on the exterior of the vehicle 602 to deploy/retract the platform/steps of the mountable elevator 600. In one implementation, the actuator assembly 604 includes a winch connected to a system of cables and pulleys to manipulate the mountable elevator 600, although other actuators and/or systems may be employed, such as a network of individual actuators placed as appropriate positions on the mountable elevator 600 (e.g., to raise and lower the elevator 600, to raise and lower the platform, to extend/retract the steps). In the illustrated implementation, the actuator assembly 604 is mounted beneath the floor 606 of the vehicle (e.g., beneath the door threshold), although other locations are contemplated.

A vertical frame 608 is movably attached the side of the vehicle 602, such that the vertical frame 608 can slide or roll up and down as the mountable elevator 600 raises and lowers. A horizontal frame 610 supports an elevator platform 630 consisting of multiple step platform pieces. When in elevator mode, the step platform pieces lay roughly in the lateral plane of the horizontal frame 610, with the step platform pieces lying flat on the horizontal frame 610 to form an elevator platform. A chain (not shown) is attached between the vertical frame 608 (or vehicle side) and the horizontal frame 610 to provide additional support for weight-bearing on the horizontal frame 610 when in use. A safety rail 622 is also attached between the vertical frame 608 (or vehicle side) and the horizontal frame 610.

Figure 7:
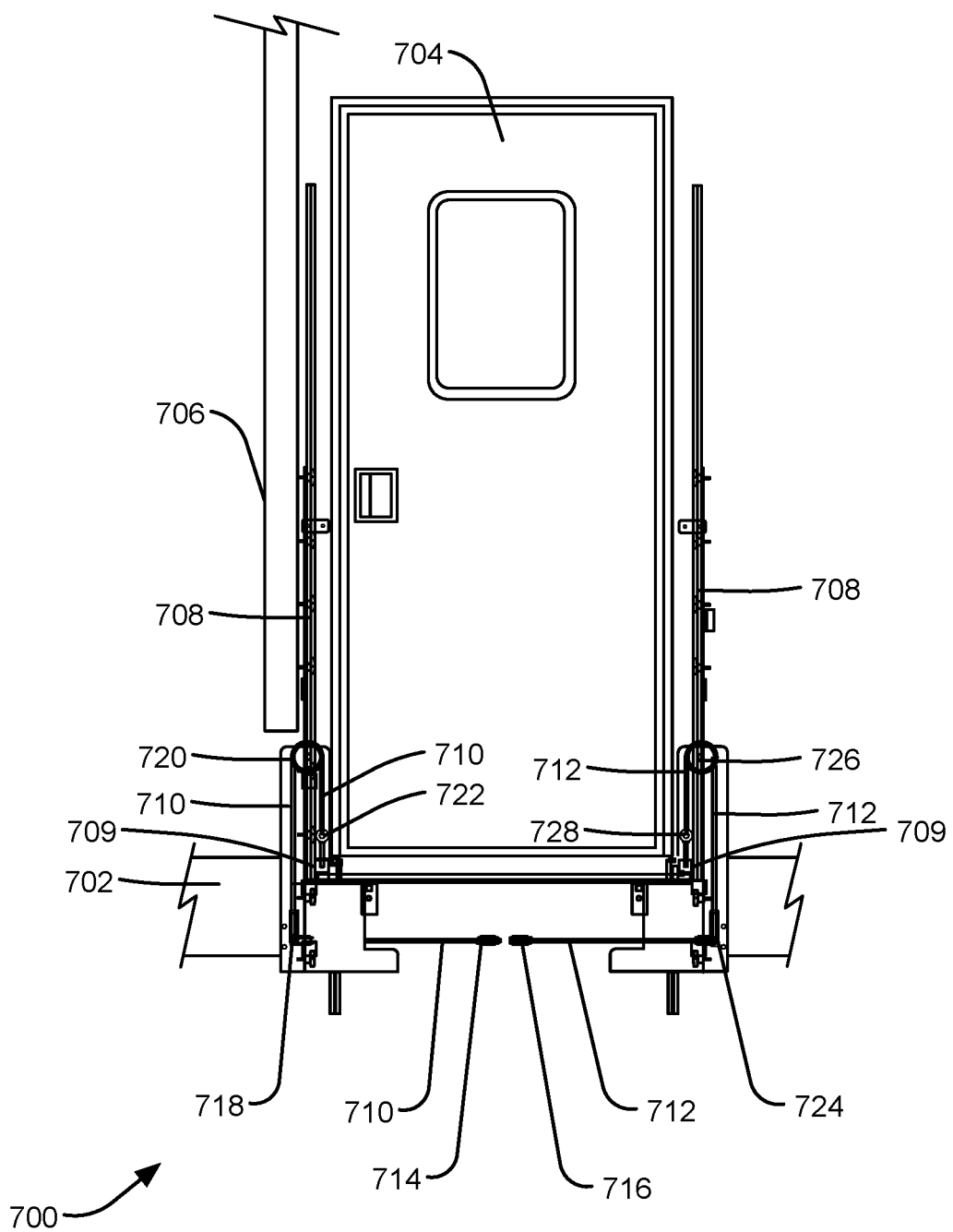
FIG. 7 illustrates a front view of an example mountable elevator mounted to an exterior of the vehicle in an elevator mode and in a raised position.

FIG. 7 illustrates a front view of an example mountable elevator 700 mounted to an exterior of the vehicle 702 in an elevator mode and in a raised position. As illustrated, the mountable elevator 700 is in a raised position. The mountable elevator 700 is positioned about an entry door 704. An awning support 706 is shown to one side of the entry door 704. The mountable elevator 700 includes two vertical frames 708, which are movably attached to the side of the vehicle 702 and two horizontal bearing frames 709 extending out from the vertical frames 708 when the mountable elevator 700 is not closed.

Cables 710 and 712 are retracted and released by a winch (not shown) in an actuator assembly (not shown) beneath the entry door 704. The winch is positioned in alignment with pulleys 714 and 716, such that the cable 710 strings through the pulley 714 and the cable 712 strings through the pulley 716. From the pulley 714, the cable 710 strings through a pulley 718 and upward around a pulley 720 and then back down to an I-bolt 722 attached to one of the horizontal bearing frames 709. From the pulley 716, the cable 712 strings through a pulley 724 and upward around a pulley 726 and then back down to an I-bolt 728 attached to one of the horizontal bearing frames 709. By retracting the cables 710 and 712, the winch raises the mountable elevator 700, and by releasing the cables 710 and 712, the winch lowers the mountable elevator 700, which is at least partially pulled down by gravity.

Figure 8:
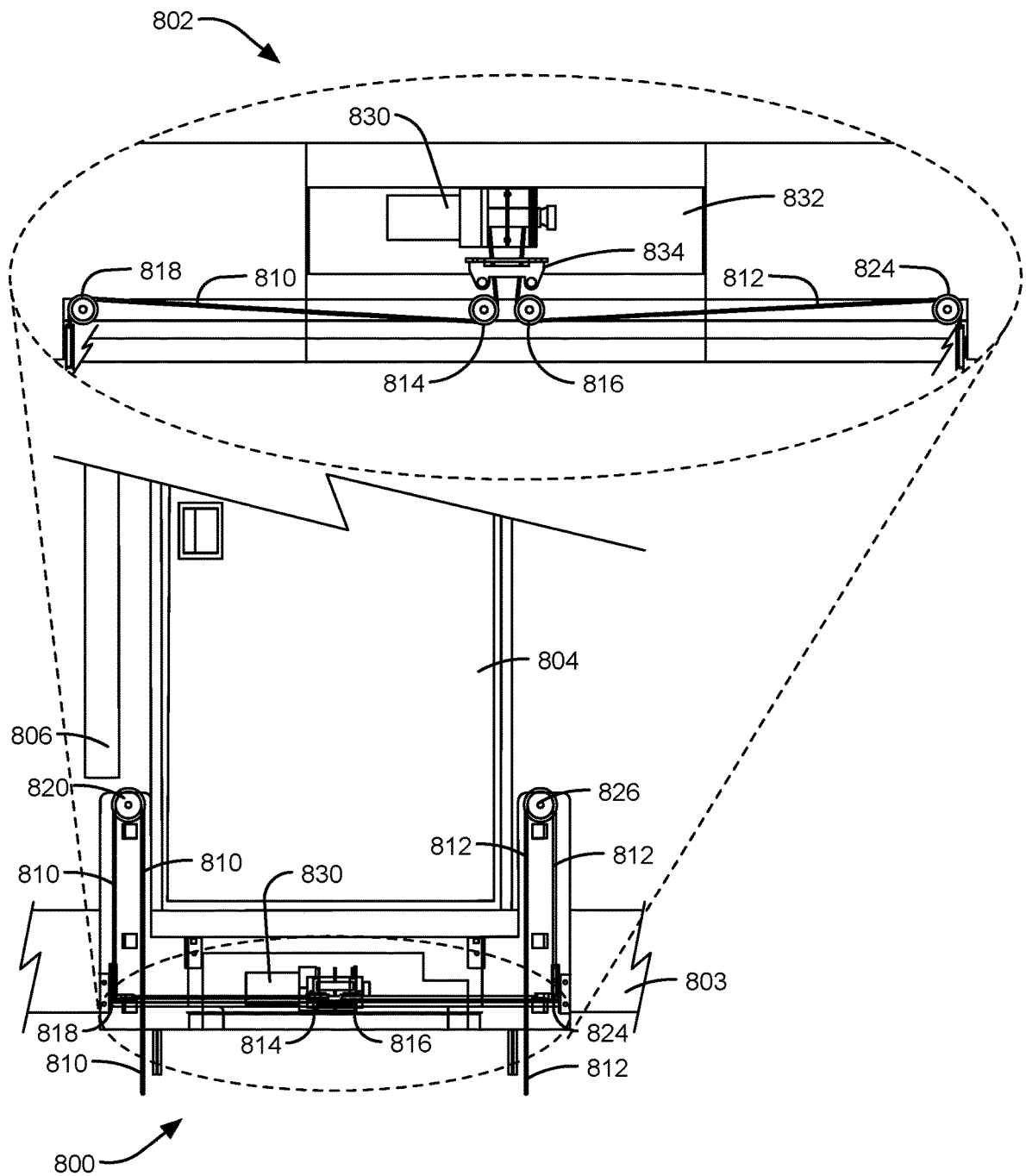
FIG. 8 illustrates a detailed view of a portion of an example cabling system for moving an example mountable elevator.

FIG. 8 illustrates a detailed view of a portion of an example cabling system 802 for moving an example mountable elevator 800. As illustrated, the mountable elevator 800 is in a lowered position. The mountable elevator 800 is positioned about an entry door 804. An awning support 806 is shown to one side of the entry door 804. The mountable elevator 800 includes two vertical frames (not shown), which are movably attached to the side of the vehicle 803 and two horizontal bearing frames (not shown) extending out from the vertical frames when the mountable elevator 800 is not closed. The horizontal bearing frames are not shown in FIG. 8 because they are lowered outside the view. The cabling system 802 is illustrated from a top cross-sectional view.

Cables 810 and 812 are retracted and released by a winch 830 in an actuator assembly 832 beneath the entry door 804. The winch 830 is positioned to string cables 810 and 812 through a cable guide bearing 834 in alignment with pulleys 814 and 816, such that the cable 810 strings through the pulley 814 and the cable 812 strings through the pulley 816. From the pulley 814, the cable 810 strings through a pulley 818 and upward around a pulley 820 and then back down to an I-bolt (not shown because the I-bolt is below the view) attached to one of the horizontal bearing frames. From the pulley 816, the cable 812 strings through a pulley 824 and upward around a pulley 826 and then back down to an I-bolt (not shown because the I-bolt is below the view) attached to one of the horizontal bearing frames. By retracting the cables 810 and 812, the winch 830 raises the mountable elevator 800, and by releasing the cables 810 and 812, the winch lowers the mountable elevator 800, which is at least partially pulled down by gravity.

Figure 9:
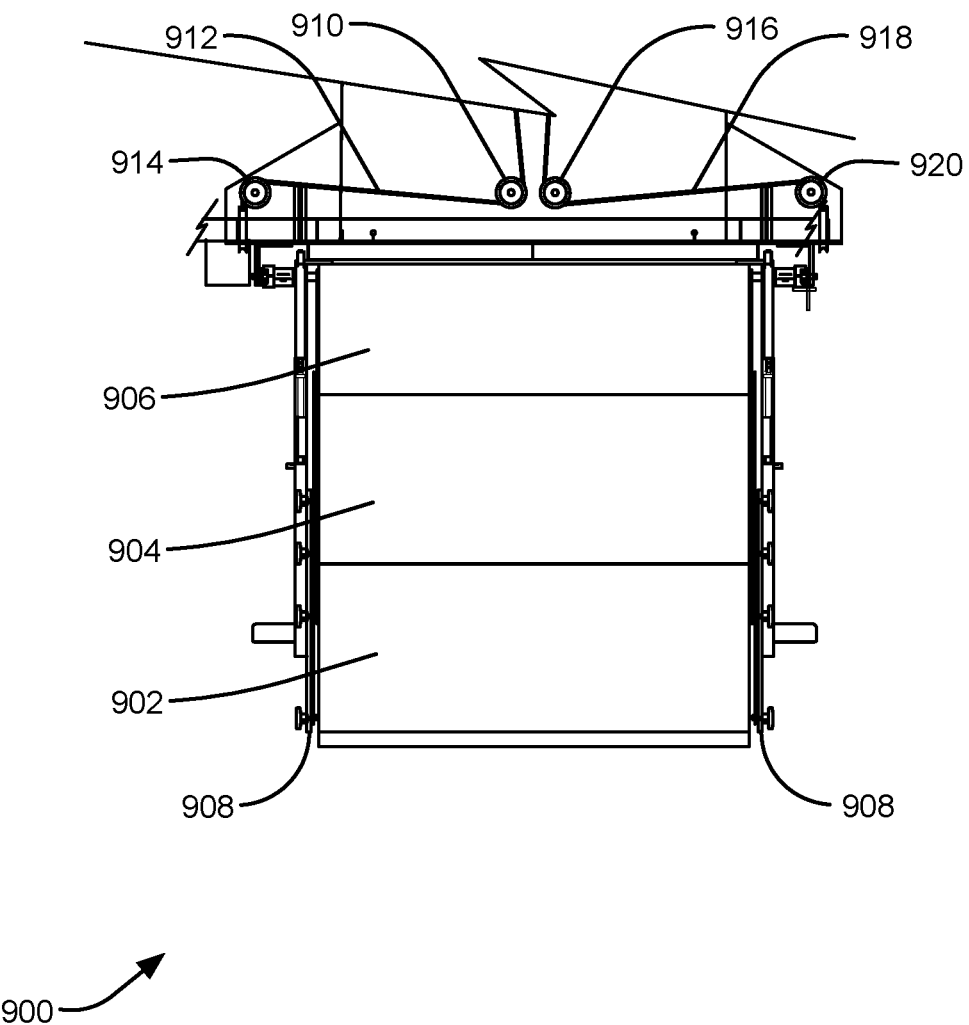
FIG. 9 illustrates a top view of an example deployed mountable elevator.

FIG. 9 illustrates a top view of an example deployed mountable elevator 900, which is opened in elevator mode to provide a flat platform made up of multiple step platform pieces 902, 904, and 906 roughly in the plane of horizontal bearing frames 908. The horizontal bearing frames 908 and the platform extend approximately perpendicularly from the side of the vehicle (not shown). When in step mode, the same multiple step platform pieces 902, 904, and 906 are separated into different planes to provide steps.

A portion of the cable 912 is shown as strung through a pulley 910 and a pulley 914. One end of the cable 912 is attached to a winch or other actuator (not shown), and the other end of the cable 912 is attached to one of the horizontal bearing frames 908. A portion of the cable 918 is shown as strung through a pulley 916 and a pulley 920. One end of the cable 918 is attached to a winch or other actuator (not shown), and the other end of the cable 918 is attached to one of the horizontal bearing frames 908.

Figure 10:
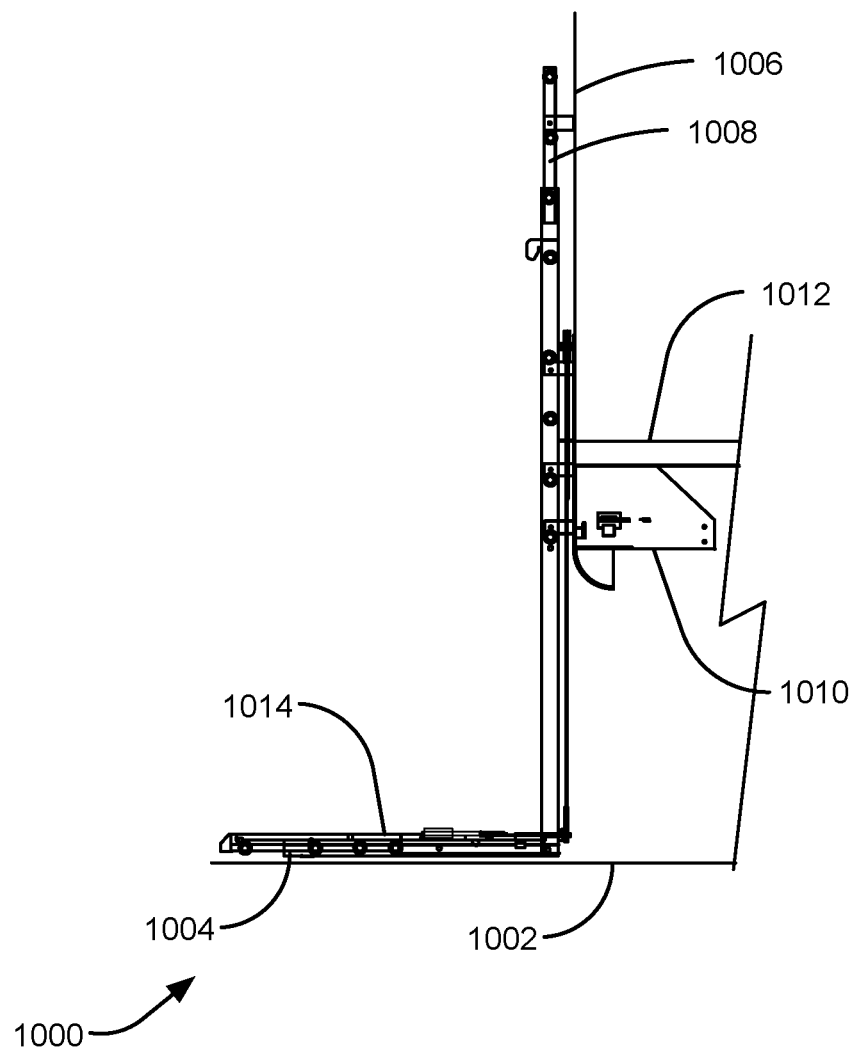
FIG. 10 illustrates a side view of an example mountable elevator deployed in an elevator mode and lowered to the ground.

FIG. 10 illustrates a side view of an example mountable elevator 1000 deployed in an elevator mode and lowered to the ground 1002. A horizontal frame 1004 extends approximately 90° from the side of a vehicle 1006. A vertical frame 1008 extends up and down the side of the vehicle 1006 and is movably attached to the side of the vehicle 1006. The horizontal frame 1004 supports a flat platform 1014 made up of multiple step platform pieces roughly in the plane of horizontal frame 1004. An actuator assembly 1010 is attached beneath the vehicle floor 1012 and operates to raise/lower and close/open the flat platform 1014.

Figure 11:
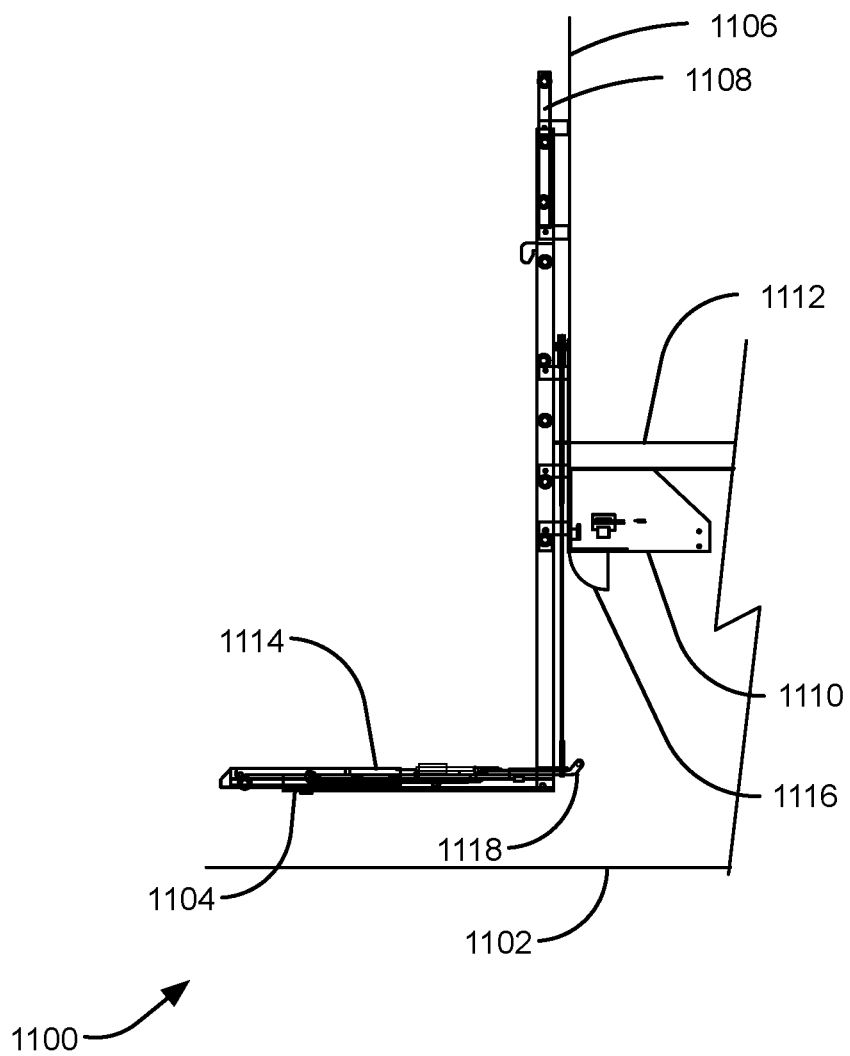
FIG. 11 illustrates a side view of an example mountable elevator deployed in an elevator mode but raised off the ground.

FIG. 11 illustrates a side view of an example mountable elevator 1100 deployed in an elevator mode but raised off the ground 1102. A horizontal frame 1104 extends approximately 90° from the side of a vehicle 1106. A vertical frame 1108 extends up and down the side of the vehicle 1106 and is movably attached to the side of the vehicle 1106. The horizontal frame 1104 supports a flat platform 1114 made up of multiple step platform pieces roughly in the plane of horizontal frame 1104. An actuator assembly 1110 is attached beneath the vehicle floor 1112 and operates to raise/lower and close/open the flat platform 1114.

A curved folding track 1116 is positioned below the actuator assembly 1110, although other placements are available. One or more folding levers 1118 can be extended via an actuator (not shown) such that the one or more folding levers 1118 contact the curved folding track 1116 as the mountable elevator 1100 is raised, causing the flat platform 1114 to tilt into a closing position.

Figure 12:
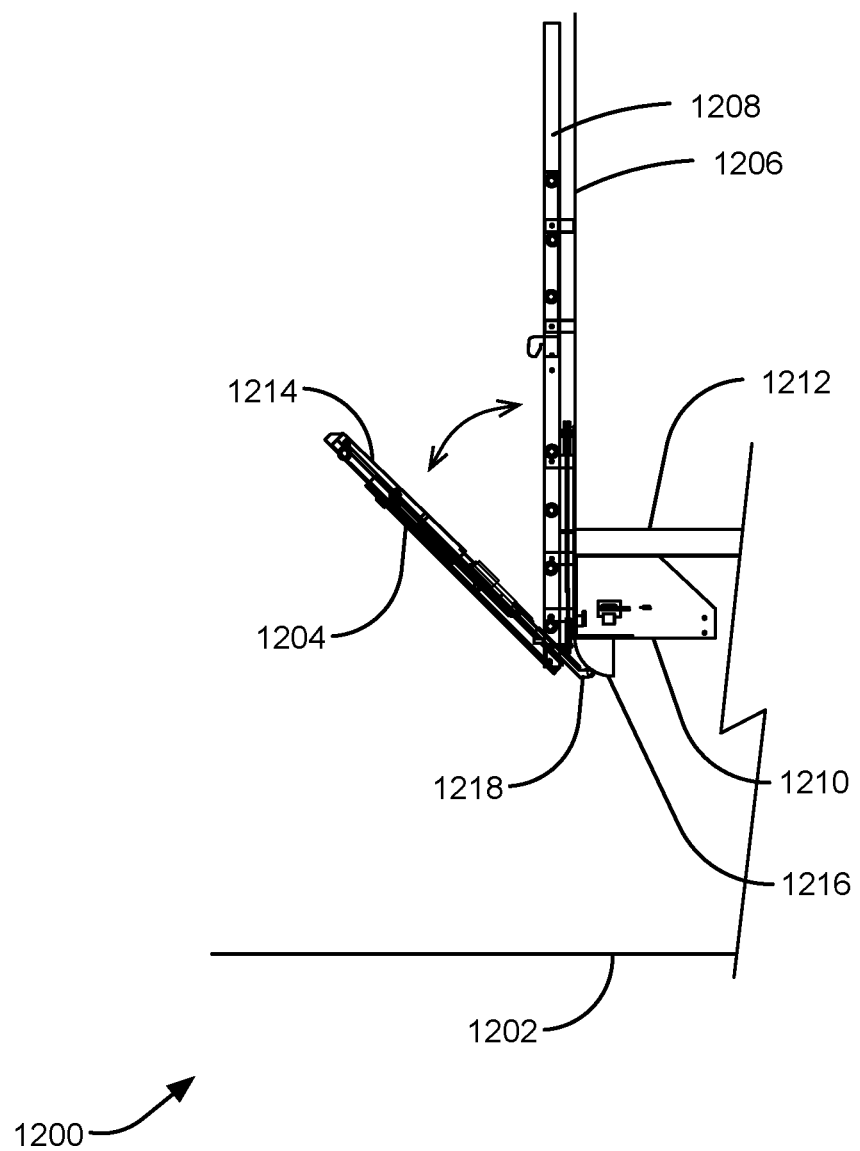
FIG. 12 illustrates a side view of an example mountable elevator deployed in a position between a closed mode and an elevator mode.

FIG. 12 illustrates a side view of an example mountable elevator 1200 deployed in a position between a closed mode and an elevator mode. A horizontal frame 1204 extends from the side of a vehicle 1206 in a closing motion as the mountable elevator 1200 is raised, as shown by the curved arrow. The curved arrow also represents an opening motion as the mountable elevator 1200 is lowered. A vertical frame 1208 extends up and down the side of the vehicle 1206 and is movably attached to the side of the vehicle 1206. The horizontal frame 1204 supports a flat platform 1214 made up of multiple step platform pieces roughly in the plane of horizontal frame 1204. An actuator assembly 1210 is attached beneath the vehicle floor 1212 and operates to raise/lower and close/open the flat platform 1214.

A curved folding track 1216 is positioned below the actuator assembly 1210, although other placements are available. One or more folding levers 1218 can be extended via an actuator (not shown) such that the one or more folding levers 1218 contact the curved folding track 1216 as the mountable elevator 1200 is raised, causing the flat platform 1214 to tilt into a closing position.

Figure 13:
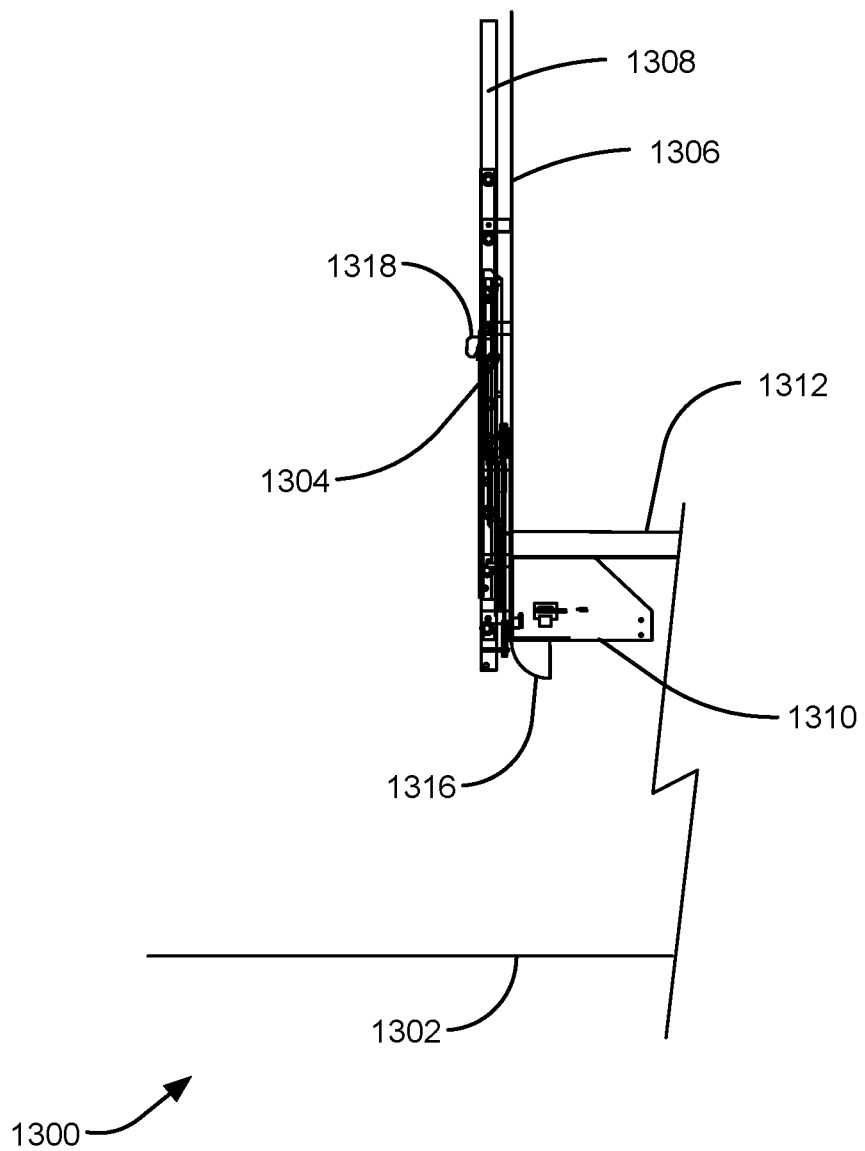
FIG. 13 illustrates a side view of an example mountable elevator in a closed mode.

FIG. 13 illustrates a side view of an example mountable elevator in a closed mode. A horizontal frame 1304 extends from the side of a vehicle 1306 and is shown in a closed position. A vertical frame 1308 extends up and down the side of the vehicle 1306 and is movably attached to the side of the vehicle 1306. The horizontal frame 1304 supports a flat platform, which is closed up against the side of the vehicle 1306 and is made up of multiple step platform pieces roughly in the plane of horizontal frame 1304. An actuator assembly 1310 is attached beneath the vehicle floor 1312 and operates to raise/lower and close/open the flat platform.

A curved folding track 1316 is positioned below the actuator assembly 1310, although other placements are available. One or more folding levers have been retracted via an actuator (not shown). A platform catch 1318 is attached to the vertical frame 1308 to secure the flat platform (e.g., via a support arm is positioned on the bottom of the flat platform, wherein the support arm slides into the platform catch 1318 to prevent the flat platform from opening when in closed mode).

Figure 14:
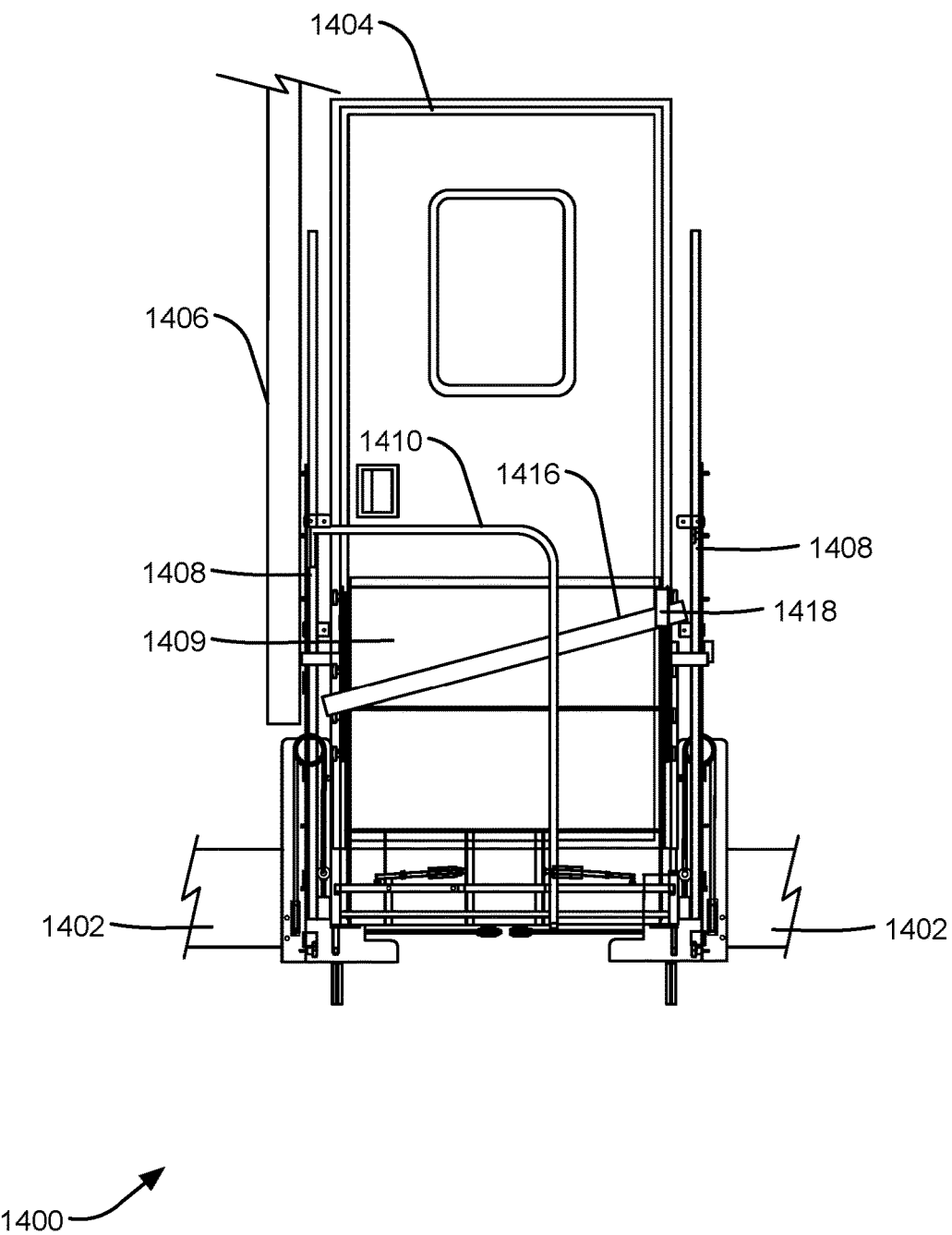
FIG. 14 illustrates a front view of an example mountable elevator in a closed mode.

FIG. 14 illustrates a front view of an example mountable elevator 1400 in a closed mode. The mountable elevator 1400 is positioned about an entry door 1404 on a side of a vehicle 1402. An awning support 1406 is shown to one side of the entry door 1404. The mountable elevator 1400 includes two vertical frames 1408, which are movably attached to the side of the vehicle 1402 and two horizontal bearing frames, which are closed up against the side of the vehicle 1402 in the closed mode.

In the closed mode, as illustrated, an elevator platform 1409 is raised toward the entry door 1404, and a safety rail 1410 is closed against the platform 1409. A support arm 1416 is positioned on the bottom of the platform 1409. When closed, the platform 1409 can be folded toward the entry door 1404, at which point one end of the support arm 1416 can be raised to fit into a platform catch 1418 to secure the platform 1409 in a closed position. In one implementation, the distance the mountable elevator 1400 is raised relative to the platform catch is limited by an infrared proximity sensor positioned at or near one of the vertical frames 1408 near the platform catch 1418. When the platform 1409 is lowered, the secured end of the support arm 1416 is released from the platform catch 1418 so that it is free to unfold into elevator or step mode.

Figure 15:
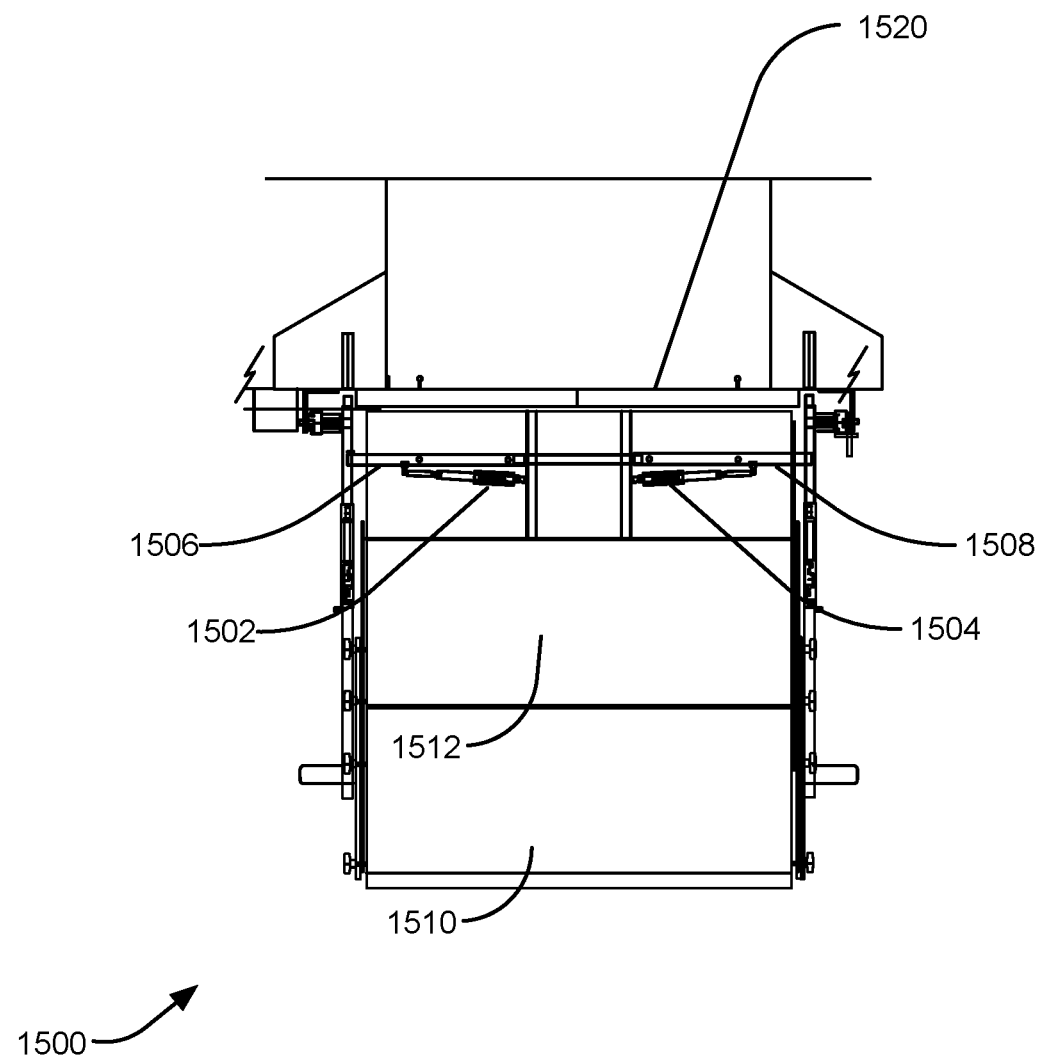
FIG. 15 illustrates a top view of an example mountable elevator with a detailed view of example step support locking actuators and example retracted step support arms.

FIG. 15 illustrates a top view of an example mountable elevator 1500 with a detailed view of example step support locking actuators 1502 and 1504 and example retracted step support arms 1506 and 1508. The mountable elevator 1500 includes a flat platform made up of multiple step platform pieces 1510 and 1512 (a third step platform piece is removed in FIG. 15 to show the actuators 1502 and 1504 and the step support arms 1506 and 1508. When in elevator mode, as shown in FIG. 15, the step support arms 1506 and 1508 are retracted to allow the third step platform piece to remain approximately in a plane with the other step platform pieces and the horizontal bearing frames. When retracted, the step support arms 1506 and 1508 can clear the obstacle 1520, allowing all of the step platform pieces steps to descend together with the horizontal bearing frames.

Figure 16:
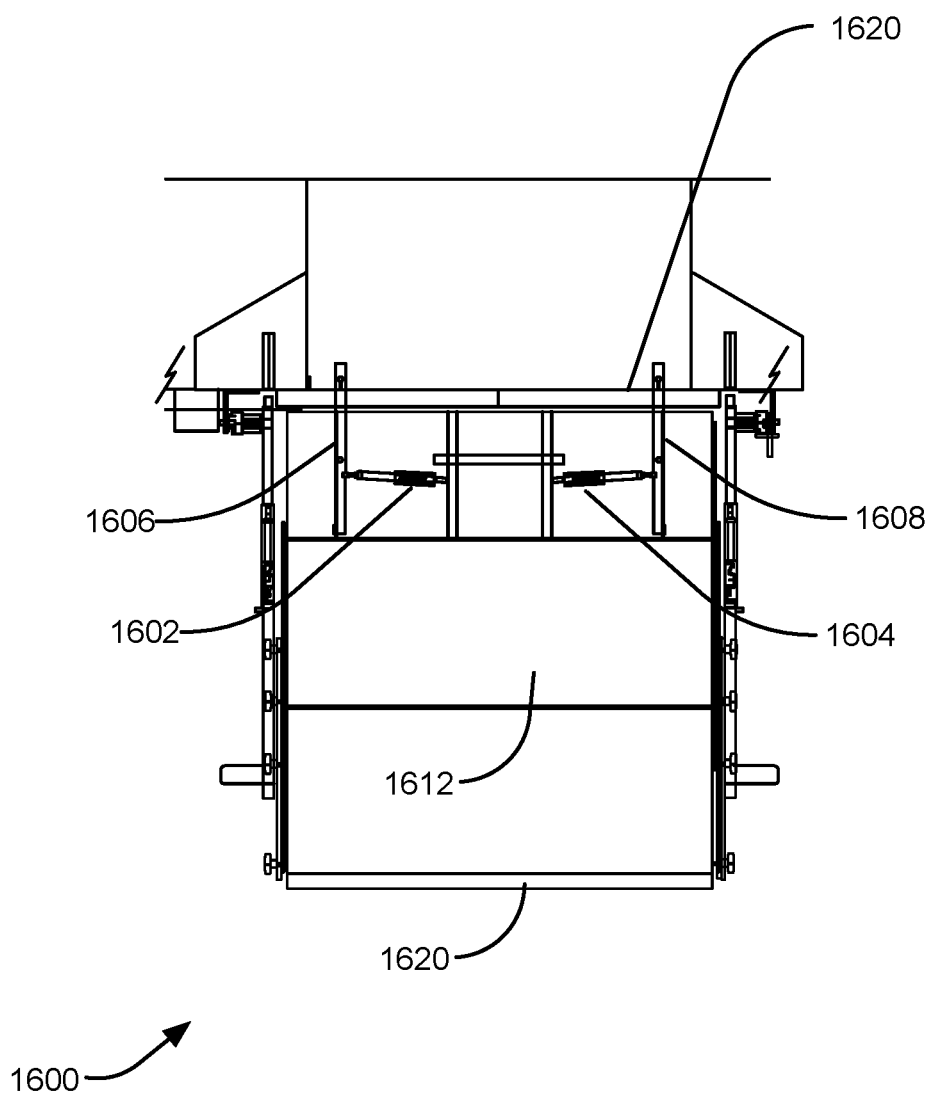
FIG. 16 illustrates a top view of an example mountable elevator with a detailed view of example step support locking actuators and example extended step support arms.

FIG. 16 illustrates a top view of an example mountable elevator 1600 with a detailed view of example step support locking actuators 1602 and 1604 and example extended step support arms 1606 and 1608. The mountable elevator 1600 includes a flat platform made up of multiple step platform pieces 1610 and 1612 (a third step platform piece is removed in FIG. 16 to show the actuators 1602 and 1604 and the step support arms 1606 and 1608. When in step mode, the actuators 1602 and 1604 retract to rotate the step support arms 1606 and 1608 toward the side of the vehicle to overlap with an obstacle 1620 (e.g., a bar, a peg, a surface) below the entry door. In this manner, as the mountable elevator 1600 lowers, the step support arms 1606 and 1608 lower into contact with the obstacle 1620, which stops their downward motion. With the top step "stopped," the pairs of stringers at each side of the platform begin to rotate up from the platform as the platform lowers, causing the multiple step platform pieces to separate into different planes to provide steps. See FIG. 5 in which the step support arms 524 are extended and in contact against a bar 526 in the actuator assembly 504 as the lower steps continue to descend.

Figure 17:
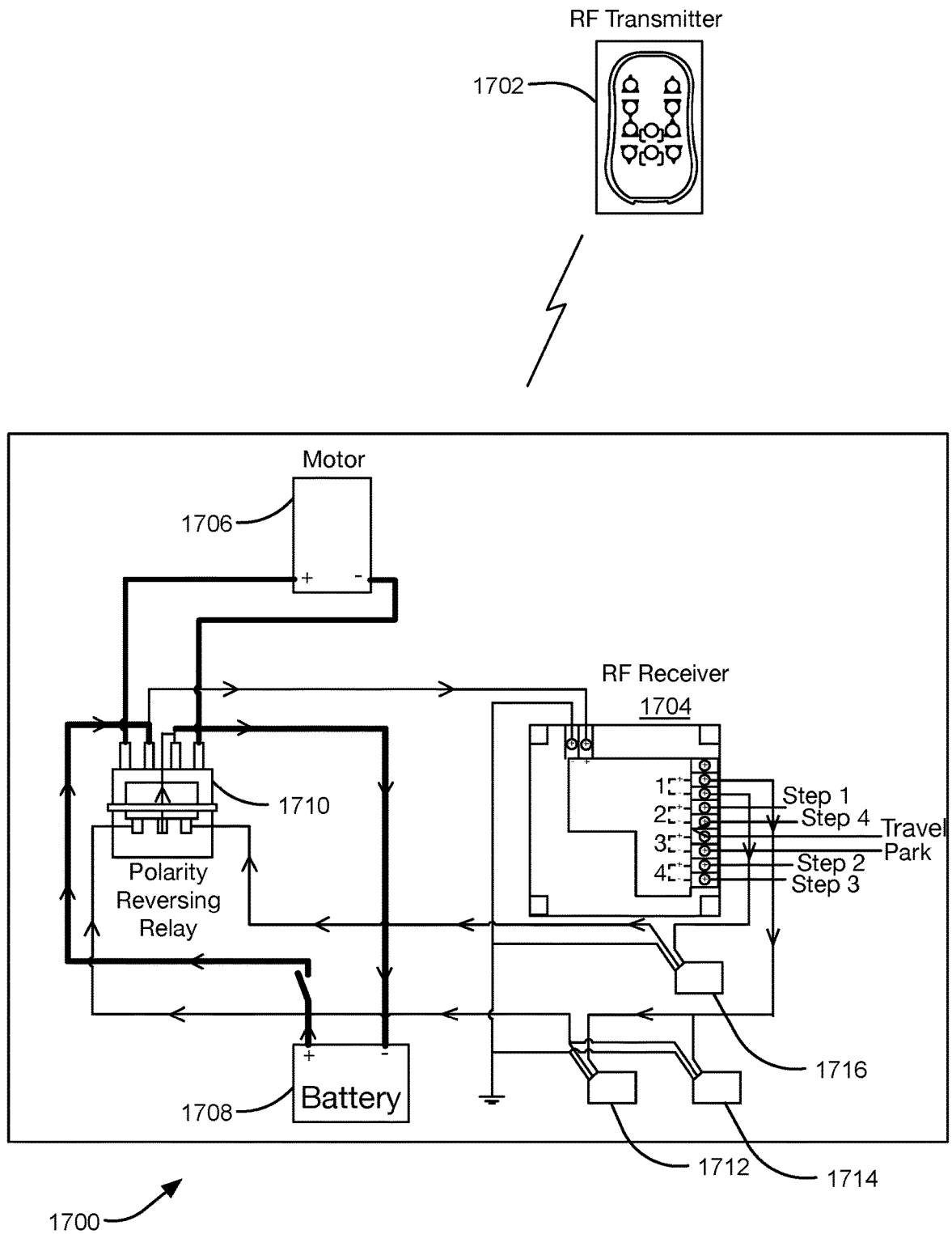
FIG. 17 illustrates an electrical wiring diagram for an RF control system for an example mountable elevator.

FIG. 17 illustrates an electrical wiring diagram for an RF control system 1700 for an example mountable elevator. The RF control system 1700 can be activated via an RF transmitter 1702, which sends radiofrequency (RF) signals containing commands to an RF receiver 1704. Example commands may include "elevator mode," "step mode," "close mode," "raise," "lower," and other commands for deploying, operating, and closing the mountable elevator via a motor 1706, which controls a winch and other actuators. Power is provided via a battery 1708, although other powers sources may be employed. In the illustrated implementation, a polarity reversing relay 1710 is employed to reverse and regulate current through the motor 1706 and other actuators.

Three limits sensors 1712, 1714, and 1716 are connected to the system to limit the travel of various elevator parts, including the travel of the platform/lower step toward the ground, the travel of the open platform upward toward the threshold of the entry door, and the upward travel of the closed platform into a closed mode against the entry door. Other combinations of limiters may also be used. In one implementation, infrared (IR) proximity sensors are used to limit such motion, although other sensors and detectors may be employed.

An example mountable elevator system includes one or more horizontal bearing frames and one or more vertical frames. Each vertical frame being connected to one of the horizontal bearing frames. One or more step stringers extend between the one or more horizontal bearing frames and the one or more vertical frames. A multi-piece platform includes multiple step pieces mounted on the one or more step stringers. Cabling extends along the one or more horizontal bearing frames and the one or more vertical frames. The cabling is configured to extend and retract the multi-piece platform.

Another example mountable elevator system of any preceding system further includes a winch connected to the cabling and configured to extend and retract the cabling and the multi-piece platform.

Another example mountable elevator system of any preceding system further includes one or more step support locking structures configured to secure a top step piece of the multi-piece platform, wherein the multiple step pieces of the multi-piece platform separate into multiple vertical levels as the multi-piece platform extends.

Another example mountable elevator system of any preceding system is provided wherein the mountable elevator system is configured for mounting on an exterior surface of a vehicle.

Another example elevator system is mountable to a vehicle. The example elevator system includes one or more horizontal bearing frames, one or more vertical frames, each vertical frame being connected to one of the horizontal bearing frames, one or more step stringers extending between the one or more horizontal bearing frames and the one or more vertical frames, a multi-piece platform including multiple step pieces mounted on the one or more step stringers, cabling connected to the elevator system, and an actuator connected to the cabling and configured to raise and lower the multi-piece platform using the cabling.

Another example elevator system of any preceding elevator system is provided wherein the multi-piece platform is configured to raise and lower relative to an entry door of the vehicle and the multiple step pieces of the multi-piece platform is configured to deploy as a flat elevator platform as the multi-piece platform is lowered in an elevator mode and as multiple descending steps as the multi-piece platform is lowered in a step mode.

Another example elevator system of any preceding elevator system further includes a winch connected to the cabling and configured to extend and retract the cabling and the multi-piece platform.

Another example elevator system of any preceding elevator system further includes one or more step support locking structures configured to secure a top step piece of the multi-piece platform, wherein the multiple step pieces of the multi-piece platform separate into multiple vertical levels as the multi-piece platform extends.

Another example elevator system of any preceding elevator system is provided wherein the elevator system is configured for mounting on an exterior surface of a vehicle.

Another example elevator system of any preceding elevator system further includes one or more step support arms attached to the multi-piece platform and one or more actuators coupled to extend the one or more step support arms, wherein the one or more step support arms are configured to deploy the multiple step pieces of the multi-piece platform as multiple descending steps as the multi-piece platform is lowered in the step mode.

Another example elevator system of any preceding elevator system further includes one or more step support arms attached to the multi-piece platform and one or more actuators coupled to retract the one or more step support arms, wherein the one or more step support arms are configured to deploy the multiple step pieces of the multi-piece platform as a flat elevator platform as the multi-piece platform is lowered in the elevator mode.

Another example elevator system of any preceding elevator system is provided wherein the multi-piece platform deploys to open away from the vertical frame as the multi-piece platform is lowered.

Another example elevator system of any preceding elevator system is provided wherein the multi-piece platform closes toward the vertical frame as the multi-piece platform is raised.

Another example elevator system of any preceding elevator system further includes a curved folding track configured to be positioned below a floor of the vehicle and a folding lever extendable from the multi-piece platform to contact the curved folding track as the multi-piece platform is raised, the folding lever causing the multi-piece platform to tilt toward the vertical frame as the folding lever is raised against the curved folding track.

Another example elevator system includes one or more vertical frames, each vertical frame movably mountable to an exterior of a vehicle at an entry door to the vehicle, one or more horizontal bearing frames connected to the one or more vertical frames, and a multi-piece platform rotatably attached to the one or more horizontal bearing frames, the multi-piece platform including multiple step pieces, wherein the multi-piece platform is configured to raise and lower relative to the entry door of the vehicle and the multiple step pieces of the multi-piece platform is configured to deploy as a flat elevator platform as the multi-piece platform is lowered in an elevator mode and as multiple descending steps as the multi-piece platform is lowered in a step mode.

Another example elevator system of any preceding elevator system further includes cabling connected to the elevator system and an actuator connected to the cabling and configured to raise and lower the multi-piece platform using the cabling.

Another example elevator system of any preceding elevator system is provided wherein the actuator includes a winch.

Another example elevator system of any preceding elevator system is provided wherein the actuator is mountable under a floor of the vehicle.

Another example elevator system of any preceding elevator system further includes one or more step stringers connected between the one or more horizontal bearing frames and the one or more vertical frames, wherein the one or more stringers separate the multiple step pieces in a diagonal orientation when the multi-piece platform is deployed in the step mode.

Another example elevator system of any preceding elevator system further includes one or more step support arms attached to the multi-piece platform, and one or more actuators coupled to extend the one or more step support arms, wherein the one or more step support arms are configured to deploy the multiple step pieces of the multi-piece platform as multiple descending steps as the multi-piece platform is lowered in the step mode.

Another example elevator system of any preceding elevator system further includes one or more step support arms attached to the multi-piece platform and one or more actuators coupled to retract the one or more step support arms, wherein the one or more step support arms are configured to deploy the multiple step pieces of the multi-piece platform as a flat elevator platform as the multi-piece platform is lowered in the elevator mode.

Another example elevator system of any preceding elevator system is provided wherein the multi-piece platform deploys to open away from the vertical frame as the multi-piece platform is lowered.

Another example elevator system of any preceding elevator system is provided wherein the multi-piece platform closes toward the vertical frame as the multi-piece platform is raised.

Another example elevator system of any preceding elevator system further includes a curved folding track configured to be positioned below a floor of the vehicle and a folding lever extendable from the multi-piece platform to contact the curved folding track as the multi-piece platform is raised, the folding lever causing the multi-piece platform to tilt toward the vertical frame as the folding lever is raised against the curved folding track.

While this specification contains many specific implementation details, these should not be construed as limitations on the scope of any inventions or of what may be claimed, but rather as descriptions of features specific to particular embodiments of particular described technology. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. An elevator system mountable to a vehicle, the elevator system comprising:
    one or more horizontal bearing frames;
    one or more vertical frames, each vertical frame being connected to one of the one or more horizontal bearing frames;
    one or more step stringers extending between the one or more horizontal bearing frames and the one or more vertical frames;
    a multi-piece platform including multiple step pieces mounted on the one or more step stringers;
    cabling connected to the elevator system;
    an actuator connected to the cabling and configured to raise and lower the multi-piece platform using the cabling;
    one or more step support arms attached to the multi-piece platform; and
    one or more actuators coupled to extend the one or more step support arms, wherein the one or more step support arms are configured to deploy the multiple step pieces of the multi-piece platform as multiple descending steps as the multi-piece platform is lowered in a step mode.

2. The elevator system of claim 1 wherein the multi-piece platform is configured to raise and lower relative to an entry door of the vehicle and the multiple step pieces of the multi-piece platform are configured to deploy as a flat elevator platform as the multi-piece platform is lowered in an elevator mode.

3. The elevator system of claim 1 further comprising:
    a winch connected to the cabling and configured to extend and retract the cabling and the multi-piece platform.

4. The elevator system of claim 1 further comprising:
    one or more step support locking structures configured to secure a top step piece of the multi-piece platform, wherein the multiple step pieces of the multi-piece platform separate into multiple vertical levels as the multi-piece platform extends.

5. The elevator system of claim 1 wherein the elevator system is configured for mounting on an exterior surface of the vehicle.

6. The elevator system of claim 1 further comprising:
one or more step support arms attached to the multi-piece platform; and
one or more actuators coupled to retract the one or more step support arms, wherein the one or more step support arms are configured to deploy the multiple step pieces of the multi-piece platform as a flat elevator platform as the multi-piece platform is lowered in an elevator mode.

7. The elevator system of claim 1 wherein the multi-piece platform is configured to open away from the one or more vertical frames as the multi-piece platform is lowered.

8. The elevator system of claim 1 wherein the multi-piece platform is configured to close toward the one or more vertical frames as the multi-piece platform is raised.

9. The elevator system of claim 1 further comprising:
a curved folding track configured to be positioned below a floor of the vehicle; and
a folding lever extendable from the multi-piece platform to contact the curved folding track as the multi-piece platform is raised, the folding lever causing the multi-piece platform to tilt toward the one or more vertical frames as the folding lever is raised against the curved folding track.

10. An elevator system comprising:
one or more vertical frames, each vertical frame movably mountable to an exterior of a vehicle at an entry door to the vehicle;
one or more horizontal bearing frames, each horizontal bearing frame being connected to one of the one or more vertical frames;
a multi-piece platform rotatably attached to the one or more horizontal bearing frames, the multi-piece platform including multiple step pieces, wherein the multi-piece platform is configured to raise and lower relative to the entry door of the vehicle and the multiple step pieces of the multi-piece platform are configured to deploy as a flat elevator platform as the multi-piece platform is lowered in an elevator mode and as multiple descending steps as the multi-piece platform is lowered in a step mode;
one or more step support arms attached to the multi-piece platform; and
one or more actuators coupled to extend the one or more step support arms, wherein the one or more step support arms are configured to deploy the multiple step pieces of the multi-piece platform as multiple descending steps as the multi-piece platform is lowered in the step mode.

11. The elevator system of claim 10 further comprising:
cabling connected to the elevator system; and
an actuator connected to the cabling and configured to raise and lower the multi-piece platform using the cabling.

12. The elevator system of claim 11 wherein the actuator includes a winch.

13. The elevator system of claim 11 wherein the actuator is mountable under a floor of the vehicle.

14. The elevator system of claim 10 further comprising:
one or more step stringers connected between the one or more horizontal bearing frames and the one or more vertical frames, wherein the one or more stringers separate the multiple step pieces in a diagonal orientation when the multi-piece platform is deployed in the step mode.

15. The elevator system of claim 10 further comprising:
one or more step support arms attached to the multi-piece platform; and
one or more actuators coupled to retract the one or more step support arms, wherein the one or more step support arms are configured to deploy the multiple step pieces of the multi-piece platform as a flat elevator platform as the multi-piece platform is lowered in the elevator mode.

16. The elevator system of claim 10, wherein the multi-piece platform is configured to open away from the one or more vertical frames as the multi-piece platform is lowered.

17. The elevator system of claim 10, wherein the multi-piece platform is configured to close toward the one or more vertical frames as the multi-piece platform is raised.

18. The elevator system of claim 10 further comprising:
a curved folding track configured to be positioned below a floor of the vehicle; and a folding lever extendable from the multi-piece platform to contact the curved folding track as the multi-piece platform is raised, the folding lever causing the multi-piece platform to tilt toward the one or more vertical frames as the folding lever is raised against the curved folding track.

* * * * *